United States Patent
Zhou

(10) Patent No.: US 10,494,057 B1
(45) Date of Patent: Dec. 3, 2019

(54) INTERNAL THREE-SPEED DUAL-CLUTCH TRANSMISSION

(71) Applicant: NINGBO ZHANGXING IMPORT AND EXPORT CO., LTD, Zhejiang Province (CN)

(72) Inventor: Zheng-Jun Zhou, Ningbo (CN)

(73) Assignee: NINGBO ZHANGXING IMPORT AND EXPORT CO., LTD, Ningbo (CN)

( * ) Notice: Subject to any disclaimer, the term of this patent is extended or adjusted under 35 U.S.C. 154(b) by 0 days.

(21) Appl. No.: 16/054,471

(22) Filed: Aug. 3, 2018

(51) Int. Cl.
*B62M 11/14* (2006.01)
*F16H 3/44* (2006.01)

(52) U.S. Cl.
CPC ............... *B62M 11/14* (2013.01); *F16H 3/44* (2013.01); *F16H 2200/0039* (2013.01); *F16H 2200/2005* (2013.01); *F16H 2200/2035* (2013.01)

(58) Field of Classification Search
None
See application file for complete search history.

(56) References Cited

U.S. PATENT DOCUMENTS

| | | | | |
|---|---|---|---|---|
| 3,067,631 A * | 12/1962 | Hayasaka | ................. | F16H 3/44 475/152 |
| 4,583,427 A * | 4/1986 | Blattmann | ................ | F16H 3/54 475/283 |
| 5,083,991 A * | 1/1992 | Yang | ...................... | B62M 11/14 192/46 |
| 5,863,270 A * | 1/1999 | Chen | ...................... | B62M 11/14 475/289 |
| 6,007,447 A * | 12/1999 | Lin | ........................ | B62M 11/14 180/206.6 |
| 7,766,780 B2 * | 8/2010 | Kim | ........................ | B62M 11/14 475/219 |

* cited by examiner

*Primary Examiner* — Colby M Hansen
(74) *Attorney, Agent, or Firm* — Muncy, Geissler, Olds & Lowe, P.C.

(57) ABSTRACT

The present invention provides an internal three-speed dual-clutch transmission, comprising a housing module, an intermediate shaft module, a planetary gear module, a driver module, a main clutch module, an auxiliary clutch module, a jack cage module and an outer gear ring module. The housing module comprises a housing, a brake adapter and a housing adapter and is configured as an output end; the intermediate shaft module comprises an intermediate shaft, a push rod, a steel ball track nut and a frame locking nut. The planetary gear module comprises at least one planetary gear, a planetary gear cage, at least one planetary gear cage pin shaft and at least one planetary gear cage jack. The push rod serves as a speed-changing push rod, the auxiliary clutch module acts as a clutch switch, and the main clutch module has the function of the clutch switch and transferring torque.

5 Claims, 5 Drawing Sheets

INTERNAL THREE-SPEED DUAL-CLUTCH TRANSMISSION

FIELD OF THE INVENTION

The present invention relates to the technical field of internal speed change and in particular, to an internal three-speed dual-clutch transmission.

BACKGROUND OF THE INVENTION

Till now, bicycles using internal speed-changing systems have become more and more popular on the market. Compared with an external speed-changing system, the internal speed-changing system has the characteristics of simple appearance, maintenance-free property and the like, and thus is very suitable for urban bicycles and shared bicycle systems. There is a huge market demand for the internal speed-changing system and it is a kind of high-tech and high value-added product. At present, there are two internal three-speed specifications on the market, and the two specifications of internal three-speed are of single-clutch structures. One is to push the clutch to change the speed through a push rod, and the other one is to pull the clutch to change the speed through a chain. The push rod or the chain for internal three-speed speed-changing is positioned on the right side of the forwarding direction of the bicycle, namely, on the right side of the clutch. For the internal three-speed of pushing the clutch to change the speed through the push rod, the advantage is light speed-changing hand feeling, but the speed-changing response is relatively slow. For the internal three-speed of pulling the clutch to change the speed through the chain, the advantage is that the internal three-speed responses fast in changing, but the speed-changing hand feeling is heavy. However, there is no transmission combining the advantages of the above-mentioned two types of internal three-speed on the market.

SUMMARY OF THE INVENTION

An objective of the present invention is to provide an internal three-speed dual-clutch transmission to solve the problems proposed in the prior art.

To achieve the foregoing objective, the present invention provides an internal three-speed dual-clutch transmission which comprises a housing module, an intermediate shaft module, a planetary gear module, a driver module, a main clutch module, an auxiliary clutch module, a jack cage module and an outer gear ring module. The housing module comprises a housing, a brake adapter and a housing adapter and is configured as an output end. The intermediate shaft module comprises an intermediate shaft, a push rod, a steel ball track nut and a frame locking nut. The planetary gear module comprises at least one planetary gear, a planetary gear cage, at least one planetary gear cage pin shaft and at least one planetary gear cage jack. The driver module comprises a gear, a driver and at least one driver jack. The main clutch module comprises a main clutch and a main clutch return spring. The auxiliary clutch module comprises an auxiliary clutch, a pin shaft, a pin shaft retainer ring, a retaining ring circlip and an auxiliary clutch return spring. The jack cage module comprises a jack cage, at least one jack, at least one cage jack pin and at least one jack return spring. The outer gear ring module comprises an outer gear ring, at least one jack pin, at least one outer gear ring jack and at least one outer gear ring jack return spring. A left side of the housing and the brake adapter are riveted together, and a right side of the housing is connected with the housing adapter through a thread. The planetary gear module passes through the intermediate shaft. The planetary gear is meshed with a sun gear, and an outer rim of the planetary gear is meshed with an inner tooth profile of the outer gear ring, so as to constitute a planetary gear speed-changing system. A left end of the planetary gear module is meshed with the brake adapter through the planetary gear cage jack. The auxiliary clutch module and the jack cage module are arranged on a right end of the planetary gear module, and the auxiliary clutch module is sleeved on the intermediate shaft.

Compared with the prior art, the present invention has the following beneficial effects. First, the present invention combines the advantages of the two types of internal three-speed on the market. Second, the push rod for changing the speed is positioned on the left side of the forwarding direction of the bicycle, that is, the push rod is on the left side of the two clutches. Third, the auxiliary clutch module acts as a clutch switch, and the main clutch module has not only the function of the clutch switch, but also the function of transferring torque.

In summary, the present invention has the following three technical advantages: 1. faster speed-changing response; 2. light speed-changing hand feeling; and 3. lower cost.

DETAILED DESCRIPTION OF THE PREFERRED EMBODIMENTS

Figure 1:
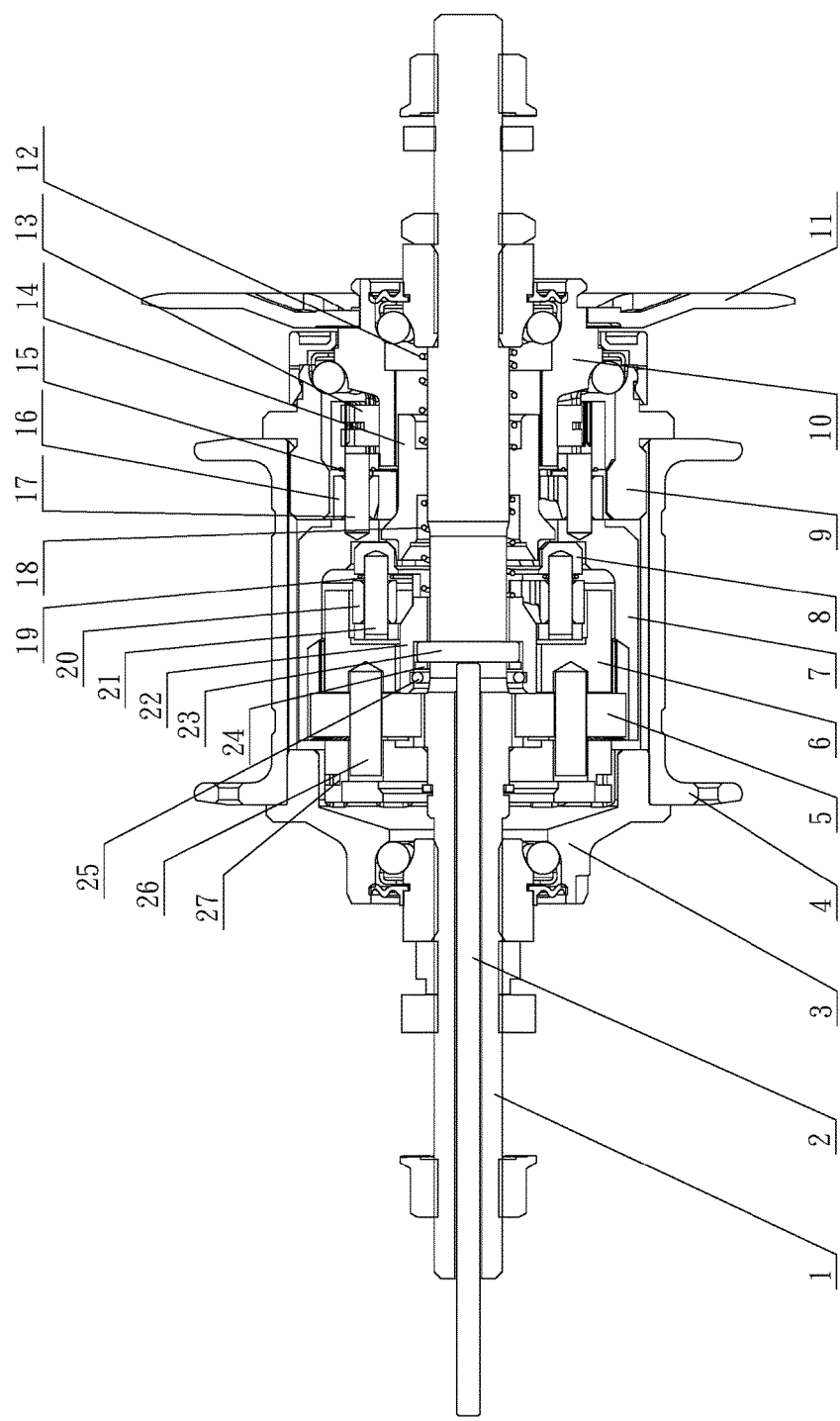
FIG. 1 is a structure schematic view showing an internal three-speed dual-clutch transmission of the present invention.
Figure 2:
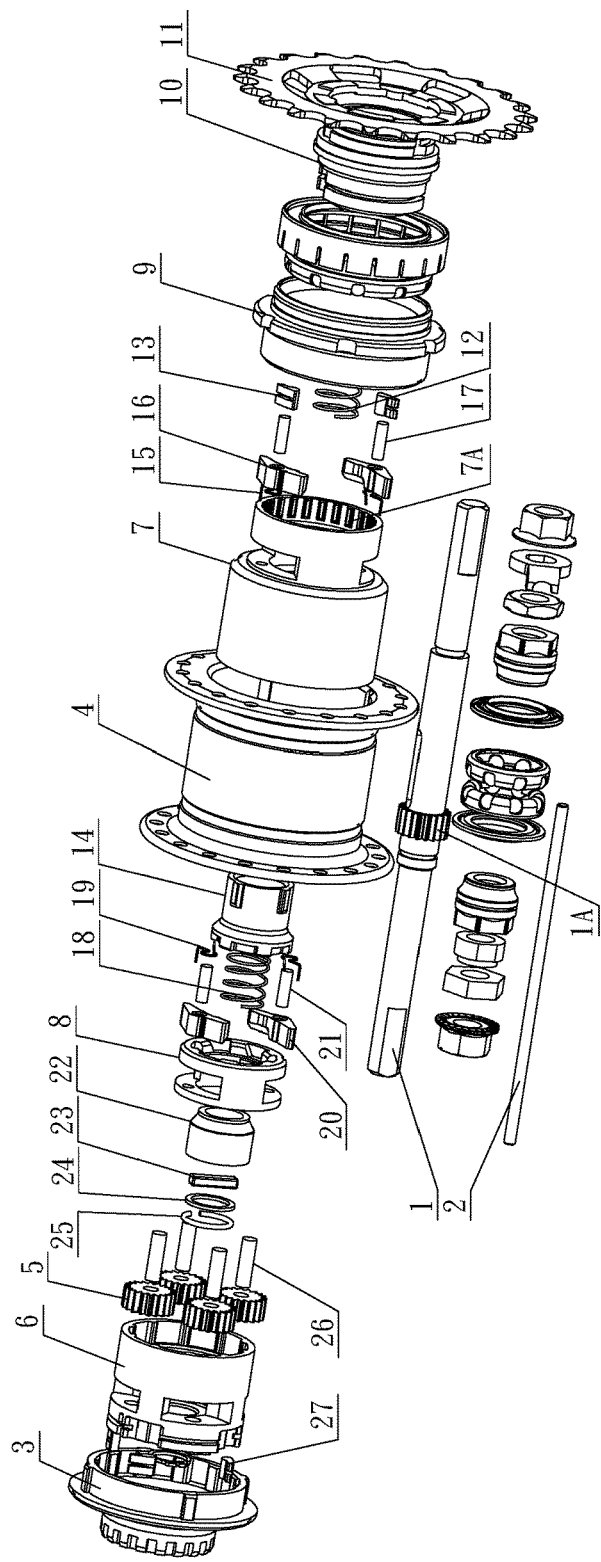
FIG. 2 is an exploded view showing the internal three-speed dual-clutch transmission of the present invention.

The technical schemes in an embodiment of the present invention are clearly and completely described below with reference to the accompanying drawings. Referring to FIGS. 1 and 2, in an embodiment of the present invention, an internal three-speed dual-clutch transmission comprises a housing module, an intermediate shaft module, a planetary gear module, a driver module, a main clutch module, an auxiliary clutch module, a jack cage module and an outer gear ring module.

The housing module comprises a housing 4, a brake adapter 3 and a housing adapter 9. The housing module is configured as an output end.

The intermediate shaft module comprises an intermediate shaft 1, a push rod 2, a steel ball track nut, a frame locking nut and the like.

The planetary gear module comprises at least one planetary gear 5, a planetary gear cage 6, at least one planetary gear cage pin shaft 26 and at least one planetary gear cage jack 27.

The driver module comprises a gear 11, a driver 10 and at least one driver jack 13. The driver module is configured as an input end.

The main clutch module comprises a main clutch 14 and a main clutch return spring 12.

The auxiliary clutch module comprises an auxiliary clutch 22, a pin shaft 23, a pin shaft retainer ring 24, a retaining ring circlip 25 and an auxiliary clutch return spring 18.

The jack cage module comprises a jack cage 8, at least one jack 20, at least one cage jack pin 21 and at least one jack return spring 19.

The outer gear ring module comprises an outer gear ring 7, at least one jack pin 17, at least one outer gear ring jack 16 and at least one outer gear ring jack return spring 15.

The housing module is configured as the output end, a left side of the housing 4 and the brake adapter 3 are riveted together, and a right side of the housing 4 is connected with the housing adapter 9 through a thread. Further, the intermediate shaft module is configured as the base, all the modules are assembled sequentially according to the intermediate shaft module, and the intermediate shaft module is locked and fixed on a frame of a bicycle. Further, the planetary gear module passes through the intermediate shaft 1. The planetary gear 5 is meshed with a sun gear 1A of the intermediate shaft 1 along the direction of internal diameter, and an outer rim of the planetary gear 5 is meshed with an inner tooth profile 7A of the outer gear ring 7, so as to constitute a planetary gear speed-changing system. A left end of the planetary gear module is meshed with the brake adapter 3 through the planetary gear cage jack 27; therefore, the planetary gear module provides output force and motion to the housing 4. The auxiliary clutch module and the jack cage module are arranged on a right end of the planetary gear module, and the auxiliary clutch module is sleeved on the intermediate shaft 1. Therefore, the auxiliary clutch module moves back and forth along the axis of the intermediate shaft 1 to push the jack 20 of the jack cage module, controlling the jack 20 open and close, so as to control the transfer path of the force and the motion.

The jack cage module is sleeved on the auxiliary clutch module, and an outer rim is meshed with a gear in the planetary gear cage 6 of the planetary gear module through the jack 20. A tooth profile is arranged at a right end of the jack cage 8, and the jack cage 8 is mashed with the main clutch module by the tooth profile. The main clutch module is sleeved on the intermediate shaft 1 so as to move back and forth along the axis. When the main clutch 14 is meshed with the jack cage 8, the rotation of the main clutch 14 drives the jack cage 8 to rotate together. When the main clutch 14 detaches from the jack cage 8, the jack cage 8 is not driven by the main clutch 14 to rotate together so that the force and the motion are not transferred to the planetary gear module anymore. An outer rim of the main clutch 14 is sleeved with the driver module, and the main clutch 14 includes a spline. The main clutch 14 is mashed with inner teeth of the driver 10 by the spline. The main clutch 14 is driven by the spline to rotate together when the driver 10 rotates. Simultaneously, the main clutch 14 moves back and forth along the axis to push the outer gear ring jack 16 to open and close, so as to control the transfer path of the force and the motion.

The driver module is sleeved on the main clutch module, a right side of the driver module is in contact with a steel ball and fixed by the steel ball track nut. An outer rim of the driver module is meshed with the inner tooth profile 7A of the outer gear ring 7 through the driver jack 13, so that the outer gear ring 7 is driven by the driver module to rotate together. A leftmost end of the outer gear ring 7 is meshed with the planetary gear 5, a rightmost end of the outer gear ring 7 is matched with the driver 10 through the driver jack 13, and a middle of the outer gear ring 7 is meshed with the inner teeth of the housing adapter 9 through the outer gear ring jack 16, so as to output the force and the motion to the housing 4.

The planetary gear module includes four planetary gears 5 and four planetary gear cage pin shafts 26. The intermediate shaft 1 is at the center, the four planetary gears 5 are disposed into the planetary gear cage 6 through the four planetary gear cage pin shafts 26. And, the planetary gear cage 6 further passes through the intermediate shaft 1 to connect the four planetary gears 5 with the sun gear 1A which is disposed on the intermediate shaft 1. The auxiliary clutch module is sleeved on the intermediate shaft 1 which is disposed on a right side of the planetary gear cage 6. The auxiliary clutch module comprises the auxiliary clutch 22, the pin shaft 23, the pin shaft retainer ring 24 and the retaining ring circlip 25. The pin shaft 23 is embedded into the auxiliary clutch 22, the pin shaft 23 is blocked by the pin shaft retainer ring 24, and the pin shaft retainer ring 24 is stuck by the retaining ring circlip 25. Therefore, when the auxiliary clutch 22 moves and rotates back and forth along the axis of the intermediate shaft 1 the pin shaft 23 is not detached. The jack cage module is arranged on a right side of the auxiliary clutch module and comprises the jack cage 8, two jacks 20, two cage jack pins 21 and two jack return springs 19. The two jacks 20 are disposed into jack grooves of the jack cage 8. The two cage jack pins 21 pass through the jack cage 8 and the jacks 20 to connect the jacks 20 and the jack cage 8. One end of each jack return spring 19 is fixed on the two jacks 20, and the other end of each is fixed on the jack cage 8. Therefore, in a free state, the two jacks 20 are opened under the action of tension of the springs. In this way, the two jacks 20 are meshed with the tooth profile of the planetary gear cage 6, thereby being capable of transferring the motion and torque, and the auxiliary clutch 22 moves back and forth in the jack cage 8. The auxiliary clutch return spring 18 is sleeved on the intermediate shaft 1 on a right side of the auxiliary clutch 22 so that the auxiliary clutch return spring 18 is connected with the main clutch 14. A right side of the main clutch 14 is sleeved with the main clutch return spring 12. The steel ball track nut is fixedly arranged on a right side of the main clutch return spring 12. The main clutch 14 is matched with the driver 10 through the spline. Thus, the main clutch 14 moves back and forth in the driver 10 along the axis. Therefore, when the driver 10 rotates, due to the cooperation of the spline, the main clutch 14 also follows the driver 10 to rotate together. A right side of the driver 10 is connected with the gear 11, the driver jack 13 and the driver 10 are assembled together through a spring. Thus, the driver jack 13 is in an open state and meshed with the inner tooth profile 7A of the outer gear ring 7, so as to be capable of transferring the motion and the torque. The outer gear ring module comprises the outer gear ring 7, the outer gear ring jack 16, the jack pin 17 and the outer gear ring jack return spring 15. One end of the outer gear ring jack return spring 15 is fixed at the outer gear ring jack 16 and the other end is fixed at the outer gear ring 7. Therefore, in the free state, the outer gear ring jack 16 is opened outward and is meshed with the tooth profile of the housing adapter 9. A left end of the outer gear ring 7 is meshed with the planetary gears 5 through the gear 11, the middle of the outer gear ring 7 is meshed with the housing adapter 9 through the outer gear ring jack 16, and a right end of the outer gear ring 7 is matched with the driver 10 through the driver jack 13.

The brake adapter 3 is riveted with the housing 4, and the housing adapter 9 is connected with the housing 4 through a thread. A left end of the intermediate shaft 1 is hollow, a through hole spline is formed in the middle of the intermediate shaft 1, and a right end of the intermediate shaft 1 is solid. The push rod 2 is sleeved on the through hole spline which is disposed at the left end of the intermediate shaft 1 and connected with the intermediate shaft 1 so that the push rod 2 pushes the pin shaft 23 through the hollow of the left end of the intermediate shaft 1 to push the clutch to move back and forth.

Figure 3:
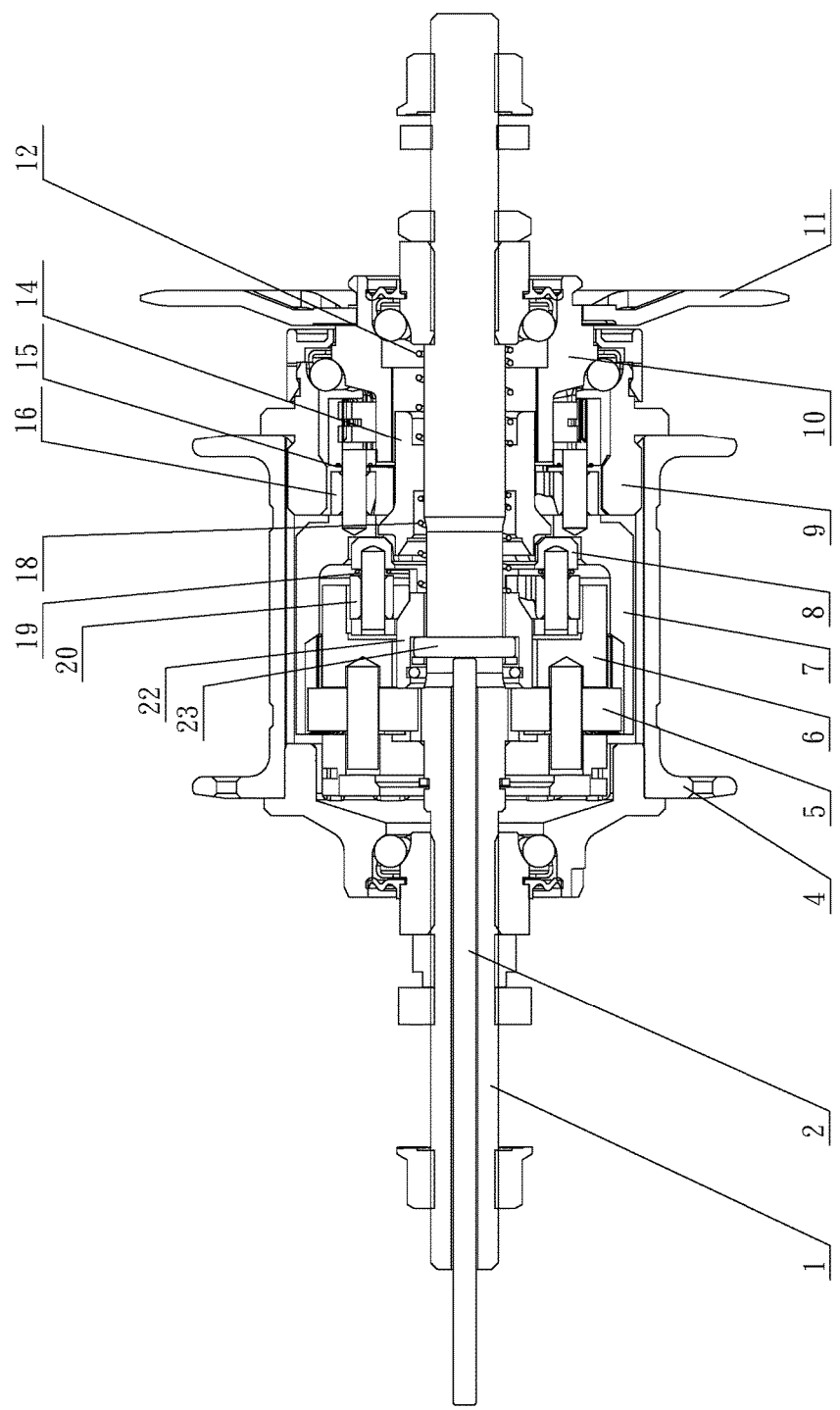
FIG. 3 is a schematic view showing the working principle of the internal three-speed dual-clutch transmission in a high-speed state of the present invention.

The operation principle of the present invention is as follows: 1. the high-speed state is as shown in FIG. 3, and the intermediate shaft 1 is fixed on the frame of the bicycle. The push rod 2 is in contact with the pin shaft 23 through an intermediate hole of the intermediate shaft 1. In this state, the push rod 2 does not exert the force on the pin shaft 23, so that the auxiliary clutch 22 is pushed to the leftmost end under the action of the auxiliary clutch return spring 18 and the auxiliary clutch 22 is not in contact with the jacks 20. Further, the jacks 20 are in the open state under the action of the jack return springs 19 and meshed with the tooth profile of the planetary gear cage 6. As the elastic force of the auxiliary clutch return spring 18 is smaller than that of the main clutch return spring 12, the main clutch 14 is also at the leftmost end under the pushing of the main clutch return spring 12 so as to be meshed with the jack cage 8 through the tooth profile. In addition, as the outer gear ring jack 16 is not in contact with the main clutch 14, the outer gear ring jack 16 is in the open state under the action of the outer gear ring jack return spring 15 so as to be meshed with the tooth profile of the housing adapter 9. Therefore, during riding, the force of the chain is transferred to the driver 10 through the gear 11. As the main clutch 14 is matched with the driver 10 through the spline, the driver 10 further transfers the force to the main clutch 14. The main clutch 14 is further mutually meshed with the jack cage 8 through the tooth profile. That is, the main clutch 14 further transfers the force to the jack cage 8, the jack cage 8 further transfers the force to the planetary gear cage 6 through the jacks 20, the planetary gear cage 6 transfers the force to the outer gear ring 7 through the planetary gears 5, and the outer gear ring 7 transfers the force to the housing adapter 9 through the outer gear ring jack 16 and finally transfers the force to the housing 4. As for this transfer path, the force is input from the planetary gears 5 and output from the outer gear ring 7, and the output is a kind of high-speed output in the planetary gear speed-changing system, so that the internal three-speed is in the high-speed state.

Figure 4:
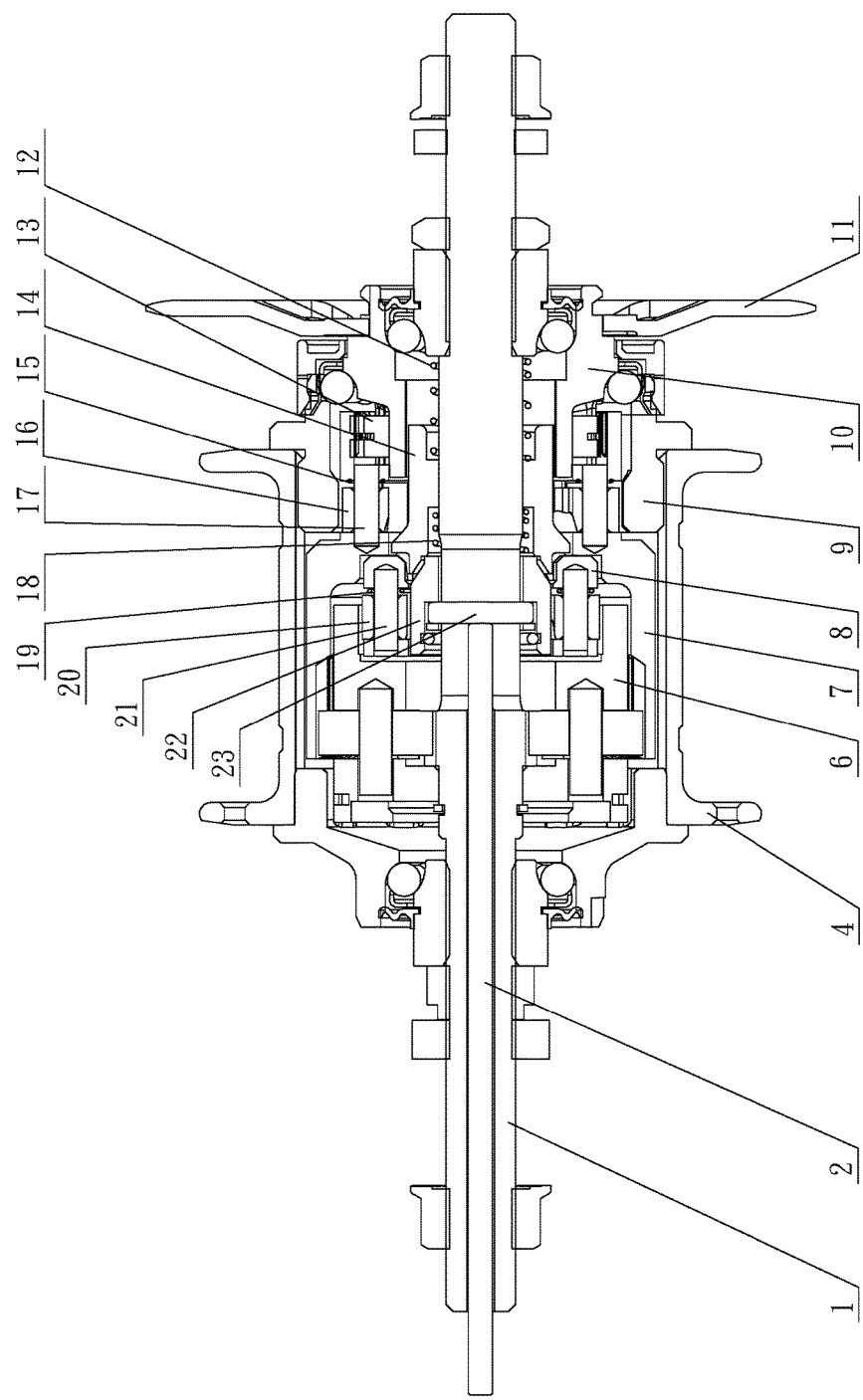
FIG. 4 is a schematic view showing the working principle of the internal three-speed dual-clutch transmission in a medium-speed state of the present invention.

2. The medium-speed state is as shown in FIG. 4:

The medium-speed state is the state that the force is transferred without passing through the planetary gears 5, and the ratio of speed-changing input to output is 1:1. When the push rod 2 is advanced one gear position to the right side, the pin shaft 23 also pushes the auxiliary clutch 22 to move one gear position to the right side, and the auxiliary clutch return spring 18 is in a compressed state. At this time, the auxiliary clutch 22 enters into the jack cage 8 to push out the jacks 20, so as to convert the jacks 20 from the open state to the closed state. Therefore, the jacks 20 are detached from the planetary gear cage 6. But as the elastic force of the main clutch return spring 12 is larger than that of the auxiliary clutch return spring 18, the main clutch 14 does not move and still remains in the original position. The outer gear ring jack 16 is not in contact with the main clutch 14 so as to be still in the open state and mutually meshed with the tooth profile of the housing adapter 9. When the driver 10 drives the main clutch 14 to rotate, the main clutch 14 drives the jack cage 8 into an idling state, and the force is not transferred from the cage of the jacks 20. When the chain transfers the force to the gear 11, the gear 11 further transfers the force to the driver 10. As the driver jack 13 is always in the open state, the force is transferred to the outer gear ring 7 through the driver jack 13, and the outer gear ring 7 transfers the force to the housing adapter 9 through the outer gear ring jack 16 and finally transfers the force to the housing 4 for final output. As the force does not pass through the planetary gears 5 to change the speed by taking this path for transferring, the speed-changing ratio of the input to the output is 1:1.

Figure 5:
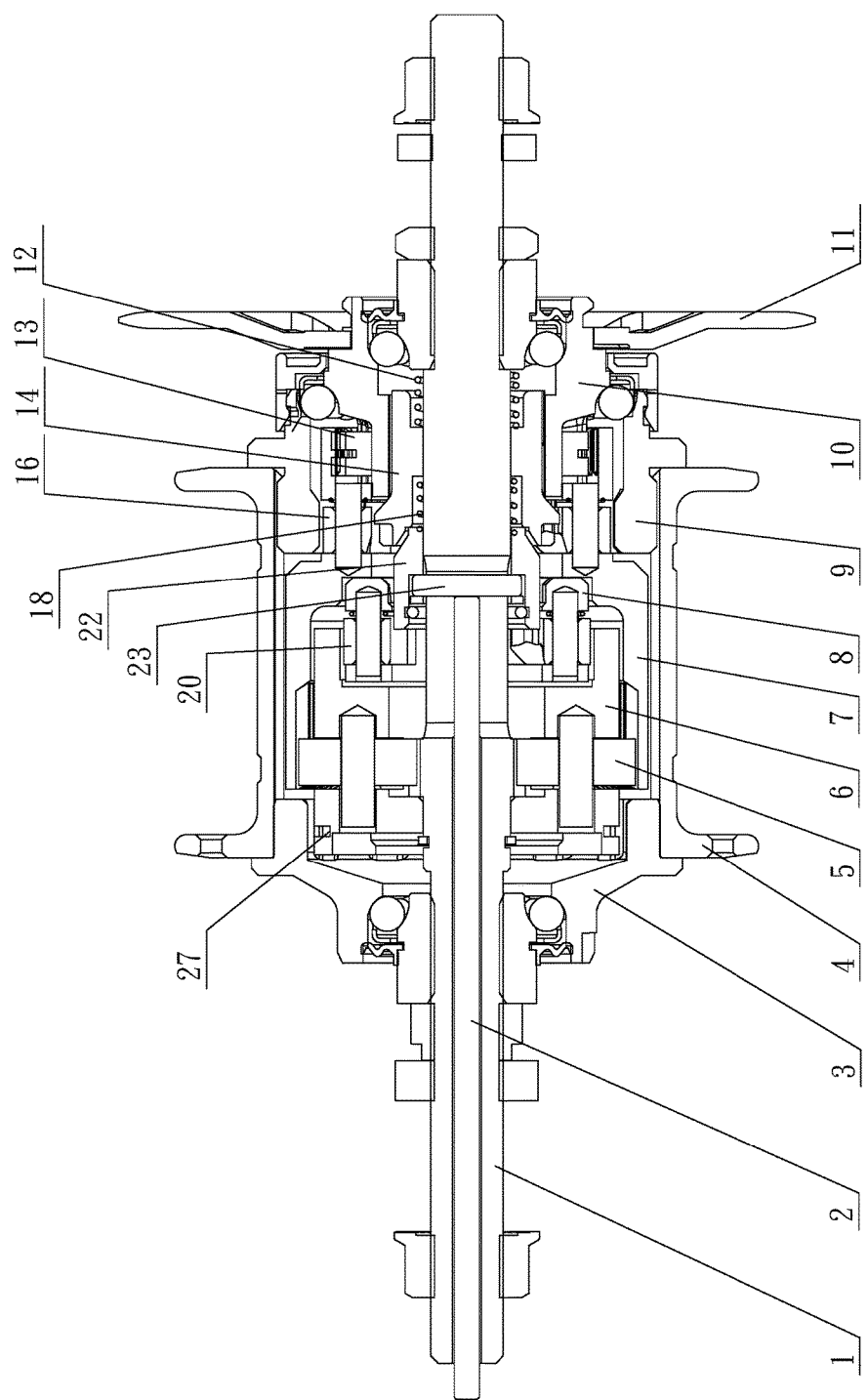
FIG. 5 is a schematic view showing the working principle of the internal three-speed dual-clutch transmission in a low-speed state of the present invention.

3. The low-speed state is as shown in FIG. 5:

The low-speed state is that the force passes through the planetary gears 5 to transfer. But this time, the force transfer is input from the outer gear ring 7 and output from the planetary gear cage 6, and the route in the planetary gear speed-changing system is in a decelerated state. When the push rod 2 is further advanced one gear position to the right, the pin shaft 23 also pushes the auxiliary clutch 22 to advance one gear position to the right. As the auxiliary clutch 22 has already been in contact with the main clutch 14 in the medium-speed state, when the auxiliary clutch 22 is further pushed one gear position to the right, the main clutch 14 advances one gear position to the right under the pushing of the auxiliary clutch 22. At this time, the main clutch 14 is in contact with the outer gear ring jack 16, and the outer gear ring jack 16 is pushed away to convert the outer gear ring jack 16 from the open state to the closed state, so that the outer gear ring jack 16 is detached from the housing adapter 9. In addition, as the auxiliary clutch 22 is still in the state of being in contact with the jacks 20, the jacks 20 are still in the closed state and not mutually meshed with the planetary gear cage 6. At this time, the auxiliary clutch return spring 18 and the main clutch return spring 12 are both in the compressed state. When the driver 10 rotates and drives the main clutch 14 to idle, the force is not transferred via the main clutch 14. Therefore, when the force of the chain is transferred to the gear 11, the gear 11 further transfers the force to the driver 10, the driver 10 transfers the force to the outer gear ring 7 through the driver jack 13, the outer gear ring 7 further transfers the force to the planetary gears 5, the planetary gears 5 further transfer the force to the planetary gear cage 6, and the planetary gear cage 6 further transfers the force to the brake adapter 3 through the planetary gear cage jack 27 and finally transfers the force to the housing 4. As for this transfer path, the force is input from the outer gear ring 7 and output from the planetary gear cage 6. Therefore, the aforesaid transfer path is the decelerated output in the planetary gear speed-changing system and the speed change is in the low-speed state.

What is claimed is:

1. An internal three-speed dual-clutch transmission, comprising:

a housing module, an intermediate shaft module, a planetary gear module, a driver module, a main clutch module, an auxiliary clutch module, a jack cage module and an outer gear ring module, wherein the improvement comprises the housing module comprising a housing, a brake adapter and a housing adapter, and the housing module configured as an output end;

the intermediate shaft module comprising an intermediate shaft, a push rod, a steel ball track nut and a frame locking nut;

the planetary gear module comprising at least one planetary gear, a planetary gear cage, at least one planetary gear cage pin shaft and at least one planetary gear cage jack;

the driver module comprising a gear, a driver and at least one driver jack;

the main clutch module comprising a main clutch and a main clutch return spring;

the auxiliary clutch module comprising an auxiliary clutch, a pin shaft, a pin shaft retainer ring, a retaining ring circlip and an auxiliary clutch return spring;

the jack cage module comprising a jack cage, at least one jack, at least one cage jack pin and at least one jack return spring;

the outer gear ring module comprising an outer gear ring, at least one jack pin, at least one outer gear ring jack and at least one outer gear ring jack return spring;

wherein a left side of the housing and the brake adapter are riveted together, and a right side of the housing is connected with the housing adapter through a thread; the planetary gear module passes through the intermediate shaft, the planetary gear is meshed with a sun gear, and an outer rim of the planetary gear is meshed with an inner tooth profile of the outer gear ring to constitute a planetary gear speed-changing system; a left end of the planetary gear module is meshed with the brake adapter through the planetary gear cage jack; and the auxiliary clutch module and the jack cage module are arranged on a right end of the planetary gear module, and the auxiliary clutch module is sleeved on the intermediate shaft.

2. The internal three-speed dual-clutch transmission of claim 1, wherein the jack cage module is sleeved on the auxiliary clutch module, and an outer rim is meshed with a gear in the planetary gear cage of the planetary gear module through the jack; a tooth profile is arranged at a right end of the jack cage, and the jack cage is mashed with the main clutch module by the tooth profile, the main clutch module is sleeved on the intermediate shaft, an outer rim of the main clutch is sleeved with the driver module, and the main clutch includes a spline, and the main clutch is mashed with an inner teeth of the driver by the spline, the main clutch is driven by the spline to rotate together when the driver rotates.

3. The internal three-speed dual-clutch transmission of claim 1, wherein the driver module is sleeved on the main clutch module, a right side of the driver module is in contact with a steel ball and fixed by the steel ball track nut; an outer rim of the driver module is meshed with the inner tooth profile of the outer gear ring through the driver jack, a leftmost end of the outer gear ring is meshed with the planetary gear, a rightmost end of the outer gear ring is matched with the driver through the driver jack, and a middle of the outer gear ring is meshed with an inner teeth of the housing adapter through the outer gear ring jack.

4. The internal three-speed dual-clutch transmission of claim 1, wherein the planetary gear module includes four planetary gears and four planetary gear cage pin shafts, the four planetary gears are disposed into the planetary gear cage through the four planetary gear cage pin shafts, and the planetary gear cage further passes through the intermediate shaft to connect the four planetary gears with the sun gear which is disposed on the intermediate shaft; the auxiliary clutch module is sleeved on the intermediate shaft which is disposed on a right side of the planetary gear cage, the pin shaft is embedded into the auxiliary clutch, the pin shaft is blocked by the pin shaft retainer ring, the pin shaft retainer ring is stuck by the retaining ring circlip, the jack cage module is arranged on a right side of the auxiliary clutch module, the jack is disposed into a jack groove of the jack cage, the cage jack pin passes through the jack cage and the jack to connect the jack and the jack cage, one end of the jack return spring is fixed on the jack and the other end is fixed on the jack cage, and the jack is meshed with a tooth profile of the planetary gear cage; the auxiliary clutch return spring is sleeved on the intermediate shaft on a right side of the auxiliary clutch so that the auxiliary clutch return spring is connected with the main clutch, and a right side of the main clutch is sleeved with the main clutch return spring; the steel ball track nut is fixedly arranged on a right side of the main clutch return spring; the main clutch is matched with the driver through a spline; a right side of the driver is connected with the gear, the driver jack and the driver are assembled together through a spring, the driver jack is in an open state and meshed with the inner tooth profile of the outer gear ring, one end of the outer gear ring jack return spring in the outer gear ring module is fixed at the outer gear ring jack and the another end is fixed at the outer gear ring, and in a free state, the outer gear ring jack is opened outward and is meshed with a tooth profile of the housing adapter; and a left end of the outer gear ring is meshed with the planetary gears through the gear, the middle of the outer gear ring is meshed with the housing adapter through the outer gear ring jack, and a right end of outer gear ring is matched with the driver through the driver jack.

5. The internal three-speed dual-clutch transmission of claim 1, wherein a left end of the intermediate shaft is hollow, a through hole spline is formed in the middle of the intermediate shaft, and a right end of the intermediate shaft is solid; and the push rod is sleeved on the through hole spline which is disposed at the left end of the intermediate shaft and connected with the intermediate shaft through the pin shaft.

* * * * *